United States Patent
Gaither

(10) Patent No.: US 7,353,336 B2
(45) Date of Patent: Apr. 1, 2008

(54) EXTERNAL RAID-ENABLING CACHE

(75) Inventor: Blaine Douglas Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 11/075,897

(22) Filed: Mar. 9, 2005

(65) Prior Publication Data

US 2006/0206661 A1    Sep. 14, 2006

(51) Int. Cl.
  *G06F 12/08* (2006.01)
(52) U.S. Cl. .................. 711/122; 711/114; 711/202
(58) Field of Classification Search ................ 711/114, 711/115, 119, 120, 122, 162, 202, 203; 714/6, 714/763; 361/683
  See application file for complete search history.

(56) References Cited

U.S. PATENT DOCUMENTS

| | | | | |
|---|---|---|---|---|
| 5,778,426 A * | 7/1998 | DeKoning et al. | .......... | 711/122 |
| 6,452,789 B1 * | 9/2002 | Pallotti et al. | .............. | 361/683 |
| 6,651,138 B2 * | 11/2003 | Lai et al. | .................... | 711/115 |
| 6,785,835 B2 * | 8/2004 | MacLaren et al. | ............. | 714/6 |
| 7,099,994 B2 * | 8/2006 | Thayer et al. | ............... | 711/114 |
| 7,103,826 B2 * | 9/2006 | Thayer et al. | .............. | 714/763 |
| 2004/0093463 A1 * | 5/2004 | Shang | ........................ | 711/113 |

OTHER PUBLICATIONS

Jung-ho Huh et al, "Hierarchical disk cache management in RAID 5 controller" Journal of Computing Sciences in Colleges, vol. 19, issue 2, Dec. 2003.*

* cited by examiner

*Primary Examiner*—Pierre-Michel Bataille

(57) ABSTRACT

Systems, methodologies, media, and other embodiments associated with RAID-enabling caches in multi-cell systems are described. One exemplary system embodiment includes a cell(s) configured with a RAID-enabling cache(s) that maps a visible address space to implement RAID memory. The example system may also include an additional cell(s) configured to facilitate implementing RAID memory by providing, for example, a mirroring location, a parity cell, and so on.

27 Claims, 12 Drawing Sheets

EXTERNAL RAID-ENABLING CACHE

BACKGROUND

Some computing systems (e.g., servers) may allow failing memory to be replaced without shutting down the server or, in some cases, without even disturbing software running on the server. These servers may employ RAID memory to facilitate the dynamic replacement. However, to implement RAID memory these servers may require sophisticated memory controllers that, for example, spread memory requests across multiple DIMM (dual in-line memory module) busses that allow hot swapping of DIMMs. While RAID originally referred to a redundant array of independent disks, when applied to memory it sometimes refers to redundant arrays of independent DIMMs. However, usage of the term RAID is not limited to systems that actually use additional and/or special DIMMs and refers more generally to systems with redundant and/or recoverable memory implemented through mirroring, striping, maintaining parity and/or ECC (error checking and correction) data, and so on.

Systems employing hot-swappable DIMMs may experience physical layout and design issues concerning, for example, proximity requirements between memory chips and controllers, physical accessibility requirements for swappable memory chips, and so on, that complicate these systems. Thus, it may be difficult and/or expensive to provide DIMM hot swappable mechanisms. Furthermore, systems using this type of DIMM hot-swapping may require operating system co-operation for memory operations like copying, remapping, re-interleaving, and so on. Additionally, these types of systems may employ different protocols for hot-swapping different components.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
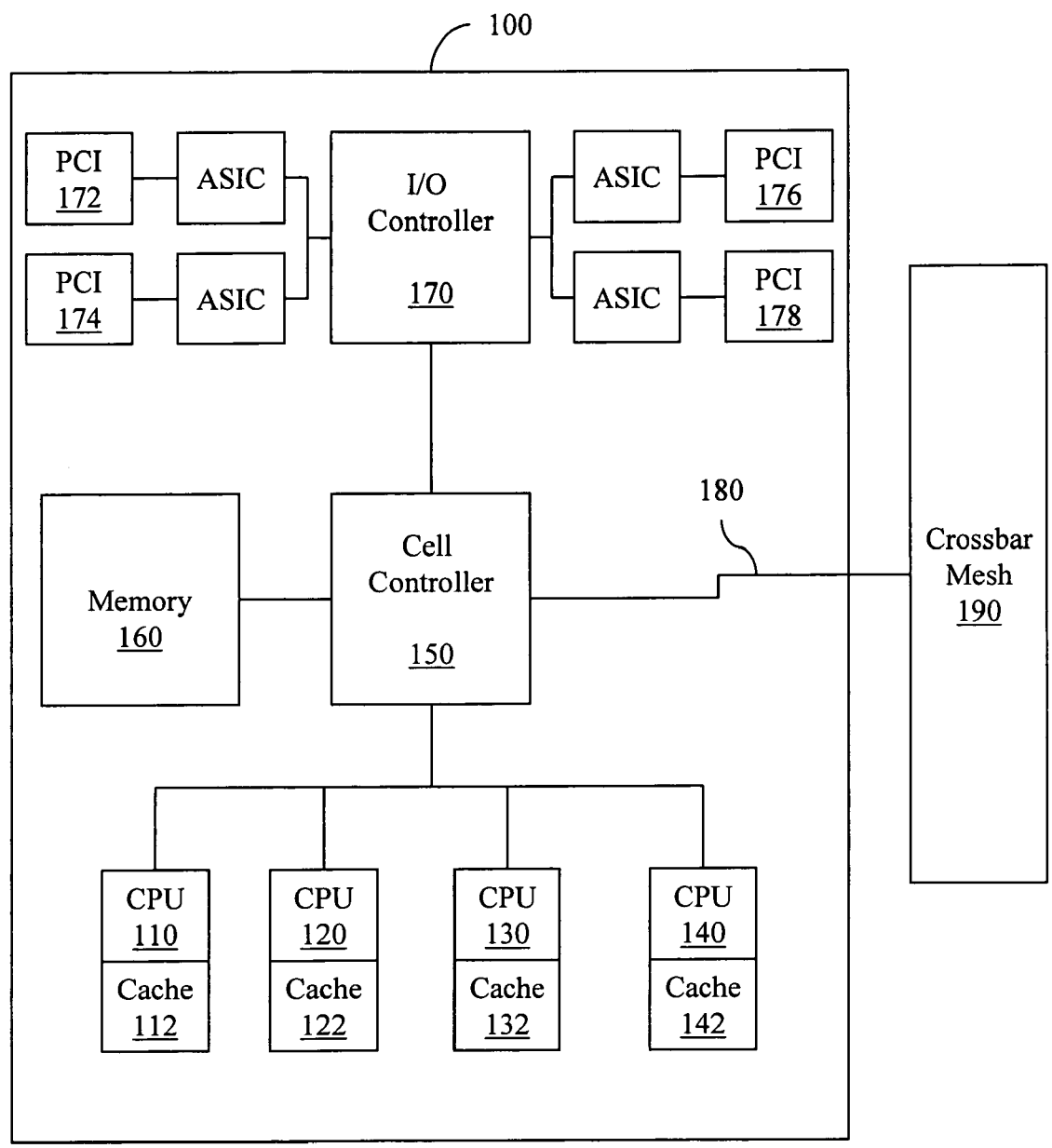
FIG. 1 illustrates an example cell.

Computing systems like server systems implemented using cellular architectures may be configured with hot swappable components like cell boards. Example systems and methods described herein facilitate configuring these multi-cell systems with RAID memory functionality without requiring specialized memory chips and/or memory controllers. This in turn facilitates in-operation replacement of memory in multi-cell systems without operating system support or co-operation. Therefore, a single, unifying, hot-swapping philosophy may be implemented for different components in a cellular server.

Example systems and methods concern using a cache(s) to map an address space visible to a CPU(s) and/or I/O components in a cellular system onto the global address space for the system so that RAID memory is established. Some example systems may include an additional cell(s) that facilitates implementing various RAID memory configurations by, for example, storing striping, mirroring, and/or parity data. In different examples, the mapping cache may be an additional cache external to a processor or may be implemented by reconfiguring an existing cache associated with a cell. In some example systems, many caches may share the mapped memory image. Thus, unlike conventional RAID memory systems, disk controllers, and so on, the RAID capable cache(s) in the example systems participate in memory coherency.

RAID memory levels described herein concern providing redundant and/or recoverable memory. Thus, RAID memory levels may correspond to RAID descriptions provided by the RAID advisory board (RAB). For example, RAID 0 may refer to a striping technique with no redundancy, RAID 1 may refer to a mirroring technique, RAID 2 may refer to a bit level striping with Hamming code ECC technique, RAID 3 may refer to a byte-level striping with dedicated parity technique, RAID 4 may refer to a block-level striping with dedicated parity technique, RAID 5 may refer to a block-level striping with distributed parity, RAID 6 may refer to a block-level striping with distributed parity, and RAID 7 may refer to asynchronous, cached striping with dedicated parity. It is to be appreciated that these example RAID levels are provided as illustrations and that other redundant/recoverable memory levels may be employed.

The following includes definitions of selected terms employed herein. The definitions include various examples and/or forms of components that fall within the scope of a term and that may be used for implementation. The examples are not intended to be limiting. Both singular and plural forms of terms may be within the definitions.

A cell may include a processor(s), a cell controlling logic (e.g., application specific integrated circuit (ASIC)), memory, a cache(s), power bricks, data busses, peripheral links (e.g., PCI) and so on. Thus, in some examples, a cell may be a self-contained unit in a symmetric multi-processing (SMP) machine where processors in a cell can access substantially any addressable memory location (e.g., byte) in the system.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, semiconductor memories, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a, user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

An example cell 100 that does not include an additional RAID-enabling cache is illustrated in FIG. 1. Cell 100 includes four processors (110, 120, 130, 140). Each of these processors is operably connected to an onboard cache (112, 122, 132, 142). While a single cache is illustrated for each of processors 110, 120, 130, 140, it is to be appreciated that processors 110, 120, 130, 140 may include multiple caches. A cache may be a primary cache located in the same integrated circuit as a processor or a secondary cache located on a different integrated circuit than the processor.

Caches attempt to exploit spatial and temporal locality of memory accesses. Spatial locality describes the observed phenomenon that if one memory location is accessed, then it is likely that a nearby memory location may also be accessed relatively quickly. Temporal locality describes the observed phenomenon that if a data item is referenced once, then it is likely to be referenced again relatively quickly. A memory system may look into a cache first for a data item before expending the time and resources to acquire the data item from a memory (e.g., 160). If the data item is found in the cache, this is referred to as a cache hit. If the data item is not found in the cache, this is referred to as a cache miss. As mentioned above, although a single cache is illustrated, a processor may be operably connected to a set of caches that may be arranged in a cache hierarchy.

Processors 110, 120, 130, 140 may be operably connected to other components in cell 100 via a cell controller 150. The cell controller 150 may be, for example, an ASIC tasked, among other things, to maintain cache coherency throughout a cellular system including cell 100. Thus, the cell controller 150 may be responsible for maintaining cache coherence in caches 112, 122, 132, and 142. Components to which processors 110, 120, 130, and 140 may be operably connected include a memory 160 (e.g., 16 GB SDRAM (synchronous dynamic RAM (random access memory))), and an i/o controller 170. Processors 110, 120, 130, and 140 may be operably connected to various devices (e.g., PCI devices 172, 174, 176, 178) via the i/o controller 170. Similarly, via a path like bus 180, the cell 100 may be connected to other cells via an interconnect 190 (e.g., crossbar mesh). Cells like cell 100 may be arranged into a cellular architecture.

Figure 2:
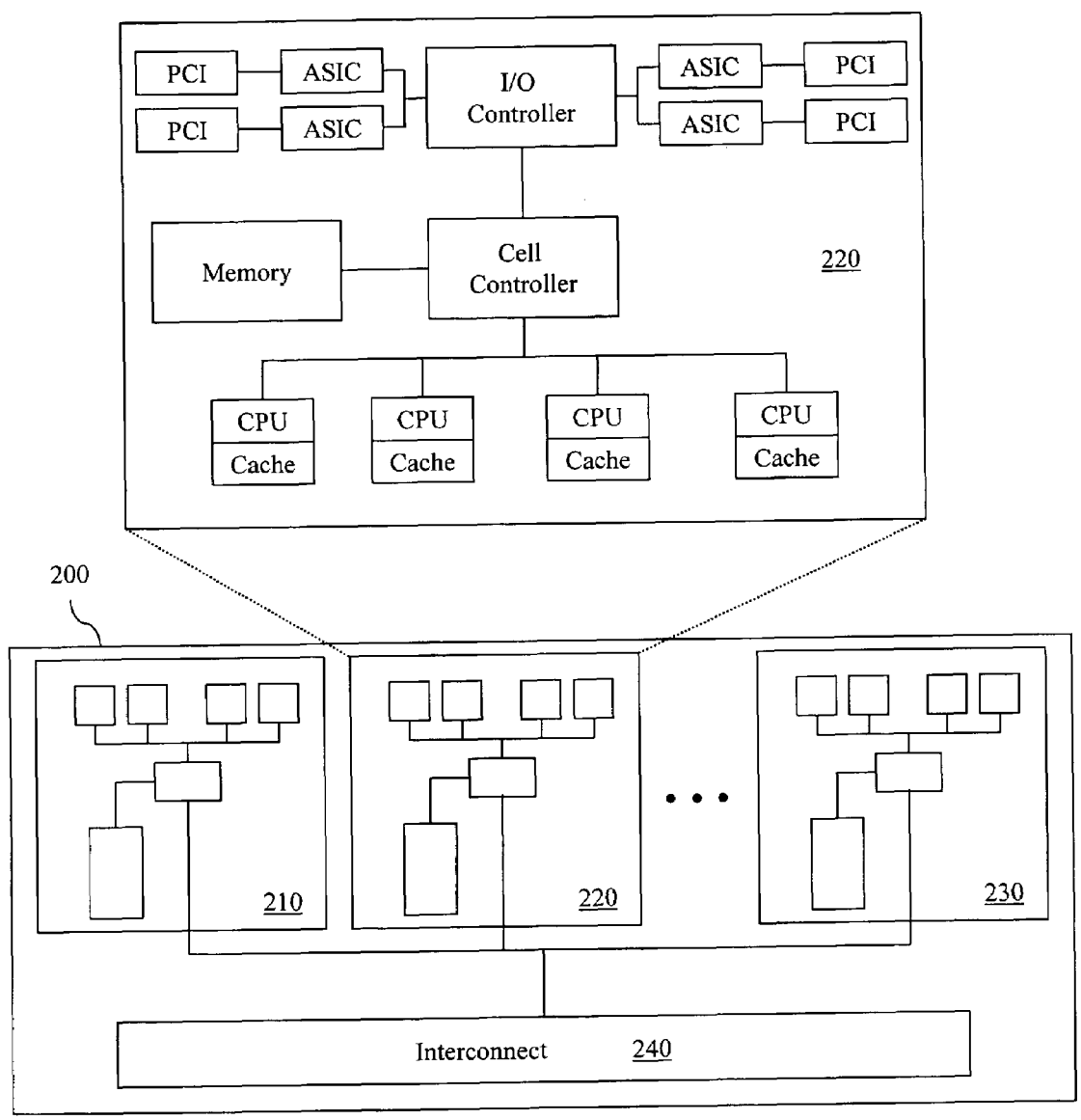
FIG. 2 illustrates an example cellular architecture.

Thus, FIG. 2 illustrates an example cellular architecture 200 that includes cells that do not include an additional RAID-enabling cache. Cellular architecture 200 may include several cells. For example cells 210, and 220 through 230 may be connected by an interconnect 240 and thus arranged into cellular architecture 200. Cells in cellular architecture 200 may include memory. Thus, the total physical address space for cellular architecture 200 may be distributed between a set of cells. Cellular architecture 200 may be configured with virtual memory. Thus, the total amount of logical memory that is addressable by applications running on cellular architecture 200 may exceed the total amount of physical memory available in cellular architecture 200.

Cell 220 is shown in detail in FIG. 2. Cell 220 includes four cpus, memory, four caches, a cell controller, and other components like those described in connection with FIG. 1. In some examples, if a processor on cell 220 is configured to address any memory location implemented in cellular architecture 200, then the cellular architecture 200 is an example of a cache coherent non-uniform memory access (ccNUMA) system. Since memory may be distributed between cells in cellular architecture 200, the memory in cell 220 may store only a portion of the total address space available to cellular architecture 200 and thus to the cpu(s) on cell 220. If a processor in cell 220 experiences a cache miss, the cell controller in cell 220 may access a memory location on cell 220 or on another cell if that is where the memory is located. The memory request(s) associated with accessing the desired memory location may traverse interconnect 240. Since each cpu on each cell may have its own cache(s), and since the total memory address space for cellular architecture 200 may be distributed between cells, cells 210 and 220 through 230 and their cache(s) may participate in a cache coherency scheme.

In some cases a cell may be configured to store a pre-defined fixed portion of the total physical address space. However, a cellular architecture like architecture 200 may have interleaved memory. Memory may be interleaved to facilitate, for example, avoiding memory hot spots and more equally distributing memory accesses between cells. Different interleaving schemes may allocate different portions of memory to different cells. If a cell loses its ability to participate in memory interleaving (e.g., cell crashes, cell component goes down), then a fault-tolerant, high-availability system may be faced with operating without the portion of memory interleaved on the non-participating cell and then, when the cell returns to participation, re-interleaving memory. Re-interleaving memory is a logically and computationally difficult task that typically involves operating system support and co-operation. Additionally, cache coherency schemes in these conventional systems may be complicated by the need to re-interleave.

Figure 3:
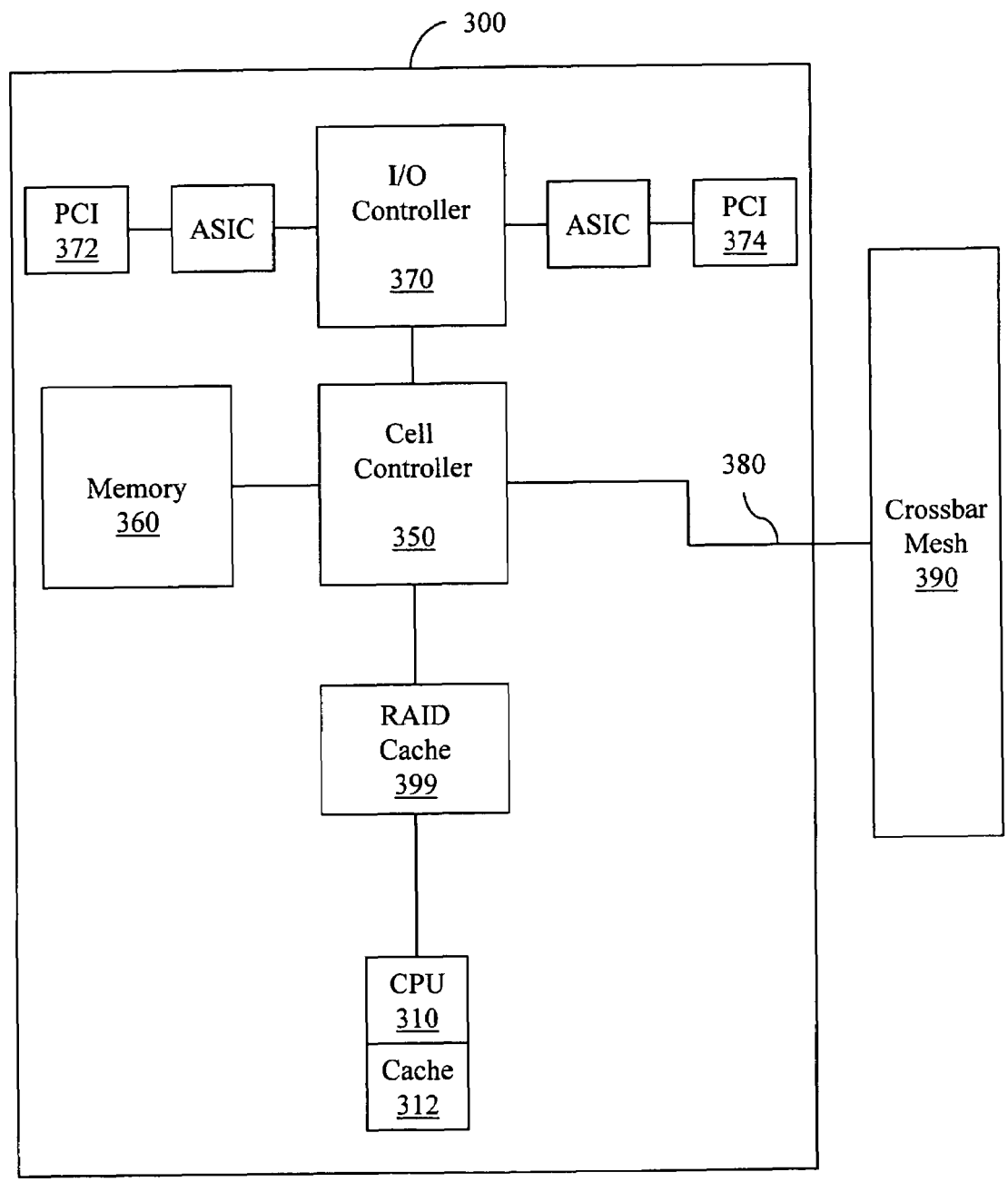
FIG. 3 illustrates an example cell configured with a RAID-enabling cache.

FIG. 3 illustrates an example cell 300 that includes an additional RAID-enabling cache 399. Additional cache 399 is configured to facilitate implementing RAID memory for a cellular architecture of which cell 300 is a component. Additional cache 399 and/or a RAID logic (not illustrated) associated with the RAID cache 399 may be configured to map an address space visible to processor 310 to implement RAID memory of various levels (e.g., RAID0, RAID5, . . . ) for the cellular architecture. In some examples, RAID cache 399 and other RAID caches described herein may include both memory and a cache controller and/or cache logic. Furthermore, the additional cache 399 may participate in a memory coherency scheme for the cellular architecture. This coherency scheme may be in addition to a cache coherence protocol employed in connection with cache 312. Implementing RAID memory through the configuration of additional cache 399 may facilitate, for example, handling a cell failure in a cellular architecture having interleaved memory without requiring re-interleaving of memory when the cell is replaced. While adding an additional cache 399 is described, it is to be appreciated that in some examples, an existing cache may be reconfigured to facilitate implementing RAID memory while participating in cache coherency.

Cell 300 may include, for example, cpu 310. While a single cpu 310 is illustrated, it is to be appreciated that a cell may have more than one cpu. Cpu 310 may be associated with a cache 312. Cpu 310 may be, for example, an Itanium® family processor. Cache 312 may be internal to cpu 310, external to cpu 310, and so on. While a single cache 312 is illustrated, it is to be appreciated that cpu 310 may be associated with one or more caches that are internal and/or external to cpu 310 and that may be arranged in a cache hierarchy. For example, an Itanium® processor may have two caches, L1 and L2, that are internal to the processor, and a third cache L3 that is external to but available to the processor. Similarly, an Itanium® II processor may have three internal caches L1, L2, and L3, and have a fourth external cache L4 available. Thus, in one example, the external L4 cache in an Itanium® II based architecture may be a candidate for being configured to implement external, cache-based memory RAIDing.

Figure 12:
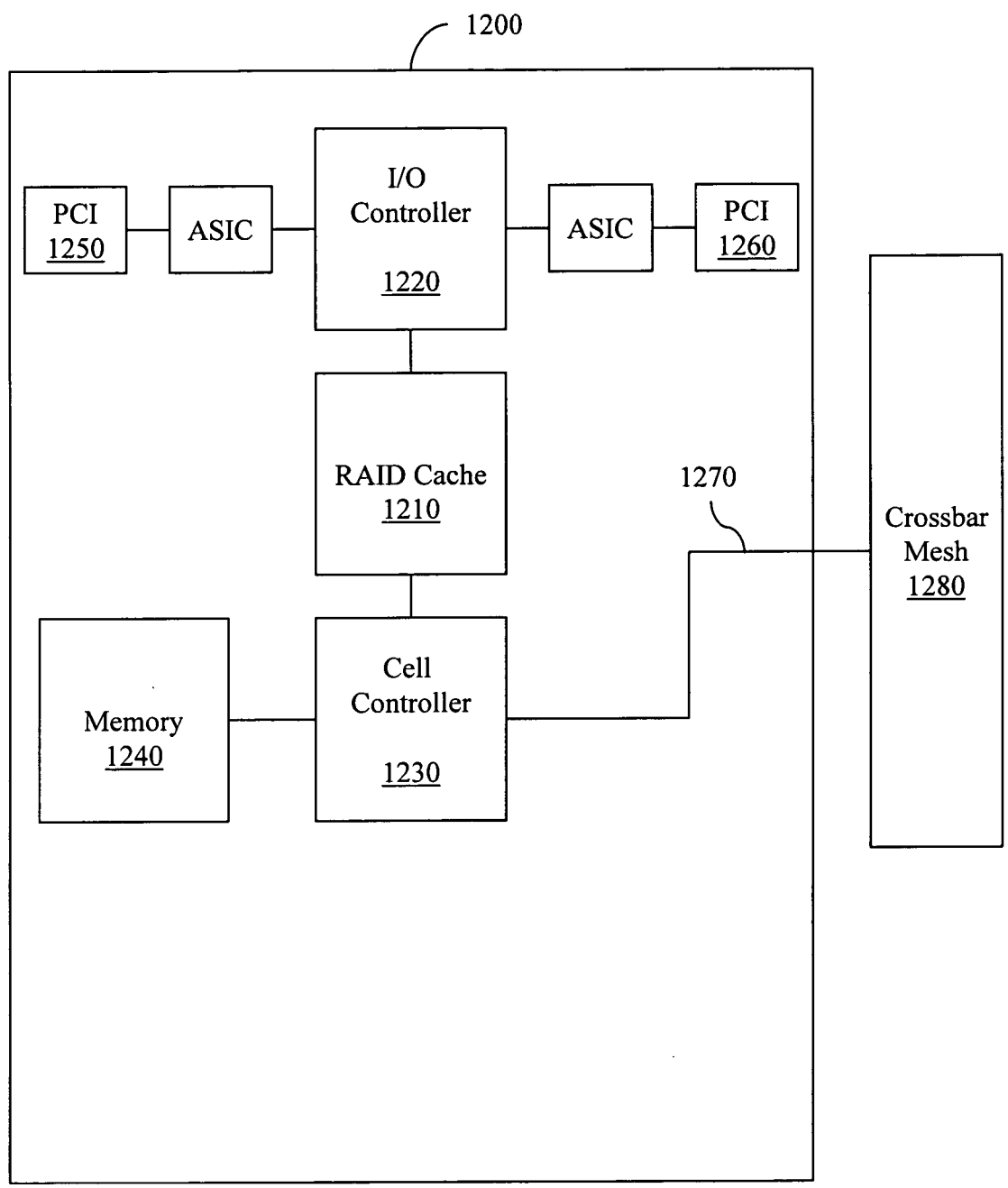
FIG. 12 illustrates an example RAID-enabling cache associated with I/O (input/output) components.

Typically, cpu 310 would interact with cache 312 on a single cache line basis. For example, a cache line may be 32 bytes long. If a cache miss occurs, cpu 310 may look in RAID cache 399. If a cache miss occurs in RAID cache 399, then cell controller 350 may look for the desired data item in memory 360 or other memories in a cellular architecture. While cpu 310 may request a single data item and receive a single cache line, additional cache 399 may, in some examples, be configured to interact with memory 360 and other memories in a cellular architecture on a super-line size basis. For example, rather than requesting a single cache line, the additional cache 399 may request two, four, eight, or so on, cache lines of data. It is to be appreciated that in a cellular architecture, additional cache 399 may interact with memory 360 on cell 300 and other memories that are located on other cells in the cellular architecture. These interactions may be communicated via bus 380 and an interconnect like crossbar mesh 390 to other cells. Thus, additional cache 399 may be configured to map the address space available in memory 360 and the other memories in the cellular architecture to implement RAID memory for cell 300 and the cellular architecture and, when involved in cache reads and/or cache cast outs, to read and/or write multiple cache lines of data associated with multiple cells similarly configured to implement RAID memory for the cellular architecture. While FIG. 3 illustrates CPU 310 interacting with RAID cache 399, it is to be appreciated that in other examples other components like I/O controller 370 and/or other I/O related logics may interact with a RAID cache. FIG. 12 illustrates one example configuration.

Figure 4:
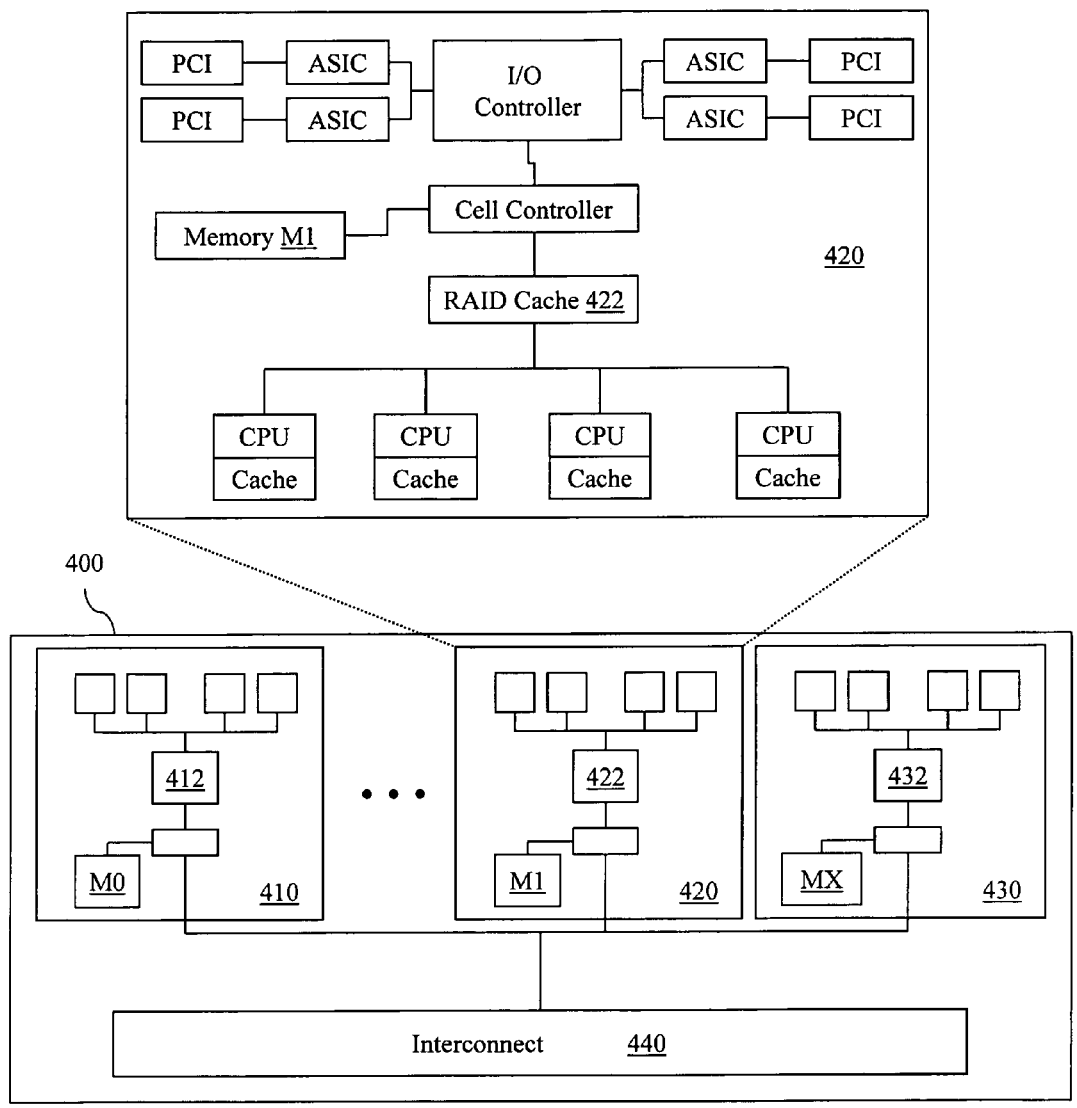
FIG. 4 illustrates an example cellular architecture implementing a RAID memory configuration.

FIG. 4 illustrates an example cellular architecture 400 that includes a set of cells 410 through 420 like those described in connection with FIG. 3. Cells 410 through 420 may each include an additional RAID-enabling cache (412, 422) and/or may have an existing cache re-tasked to perform the RAID-enabling action. In some example systems, cellular architecture 400 may include an additional cell(s) (e.g., 430) that is configured to facilitate implementing RAID memory for the cellular architecture 400 by, for example, storing RAID-enabling data. Cell 430 may, like cells 410 through 420 include an additional RAID-enabling cache 432. In one example, information stored in memories M0 on cell 410 through M1 on cell 420 may be replicated in memory MX on cell 430, parity information for memory stored on cells 410 through 420 may be stored on cell 430, and so on. Thus, cell 430 may, in some examples, be referred to as a RAID-enabling cell. In one example, the additional RAID caches (e.g., RAID cache 432 in cell 420) may be configured to virtualize the physical address space of cpus in cellular architecture 400 to a RAIDed address space in a cellular architecture containing both data and parity containing cells.

In another example, RAID caches may also be configured to facilitate mapping requests associated with I/O controllers in cells. See, for example, FIG. 12.

In an interleaving example in a conventional system, memory may have been interleaved between M cells. In one RAIDing example, the memory may be interleaved between N cells (N>M), with one of the N cells storing parity information. Thus, if a single cell becomes unavailable to participate in interleaving, the remaining cells may, in conjunction with the additional RAID-enabling cell, facilitate recreating the information that was stored in the memory on the non-participating (e.g., crashed) cell. This recreation can be performed without re-interleaving the memory. The recreation may also be performed on cells having conventional DIMMs, conventional cell controllers, conventional busses, and without operating system support or intervention. In FIG. 4, cell 430 may perform the role of the RAID-enabling cell.

As described above, the additional cache(s) that are configured to implement RAID memory may be configured to participate in cache coherency. This cache coherency information may be used to selectively determine whether parity needs to be written upon a cast out from a RAID-enabling cache. Thus, example systems may exhibit coherency above and coherency below with both caches local to a cpu having coherency managed and the additional RAID-enabling cache having coherency managed. Disk based RAID-enabling clearly does not rely on coherency information and therefore does not exhibit multiple levels of cache coherency like example systems described herein.

Figure 5:
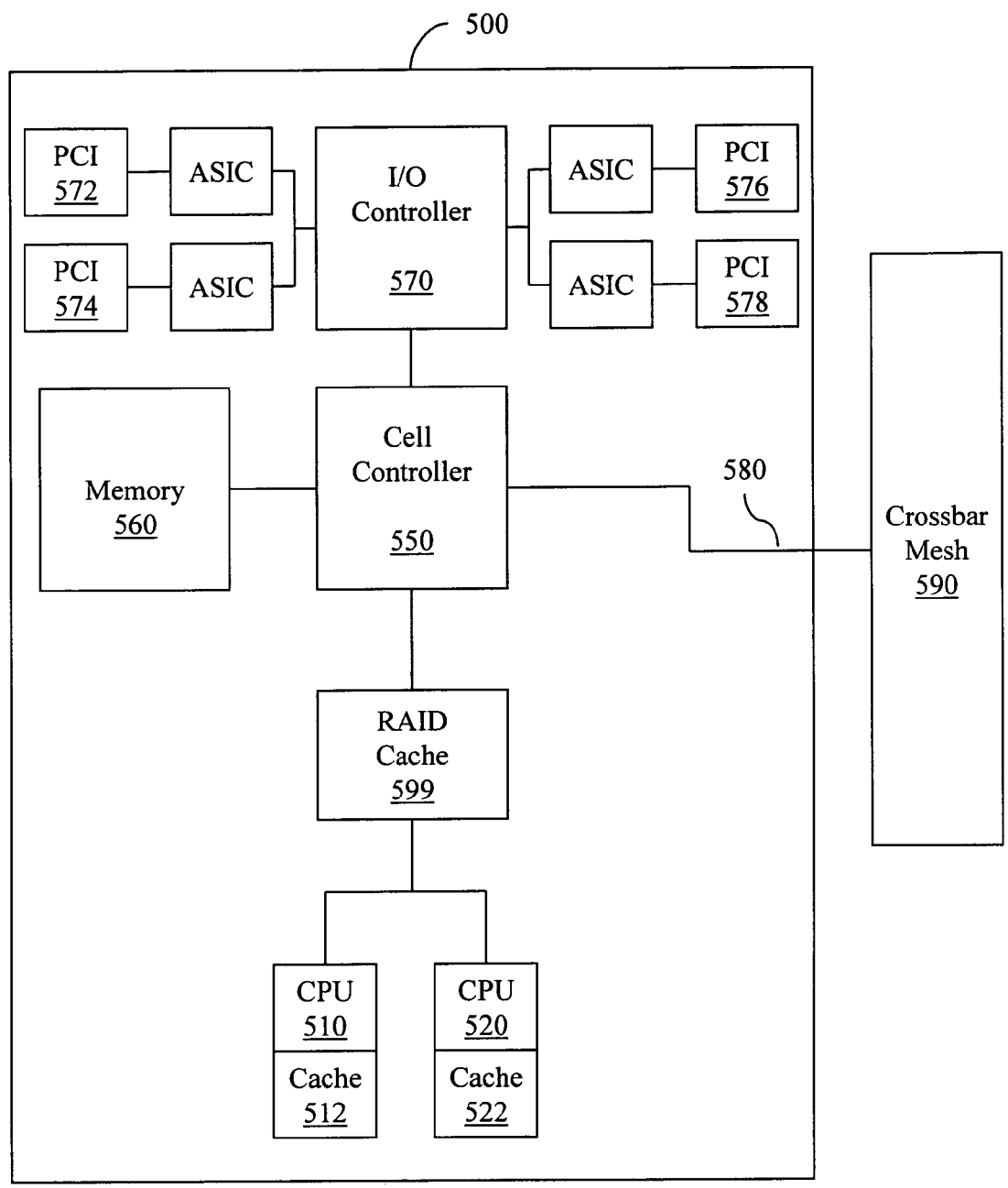
FIG. 5 illustrates an example cell configured with a RAID-enabling cache.

FIG. 5 illustrates an example cell 500 configured with two cpus (510 and 520), each having a local cache(s) (512 and 522 respectively). The example cell 500 also includes a RAID cache 599 that is configured to facilitate implementing RAID memory for a cellular architecture including cell 500. RAID cache 599 may, for example, map an address space visible to cpus 510 and 520 to implement RAID memory. In one example, a mirroring RAID example, data written to memory 560 may be replicated in another cell. In another example, a RAID5 example, writing data to memory 560 and other memories in the cellular architecture may include selectively writing parity information to an additional RAID-enabling cell(s) and/or cells configured to selectively store parity information. While a single RAID cache 599 is illustrated, it is to be appreciated that cell 500 may have one or more RAID-enabling caches.

Figure 6:
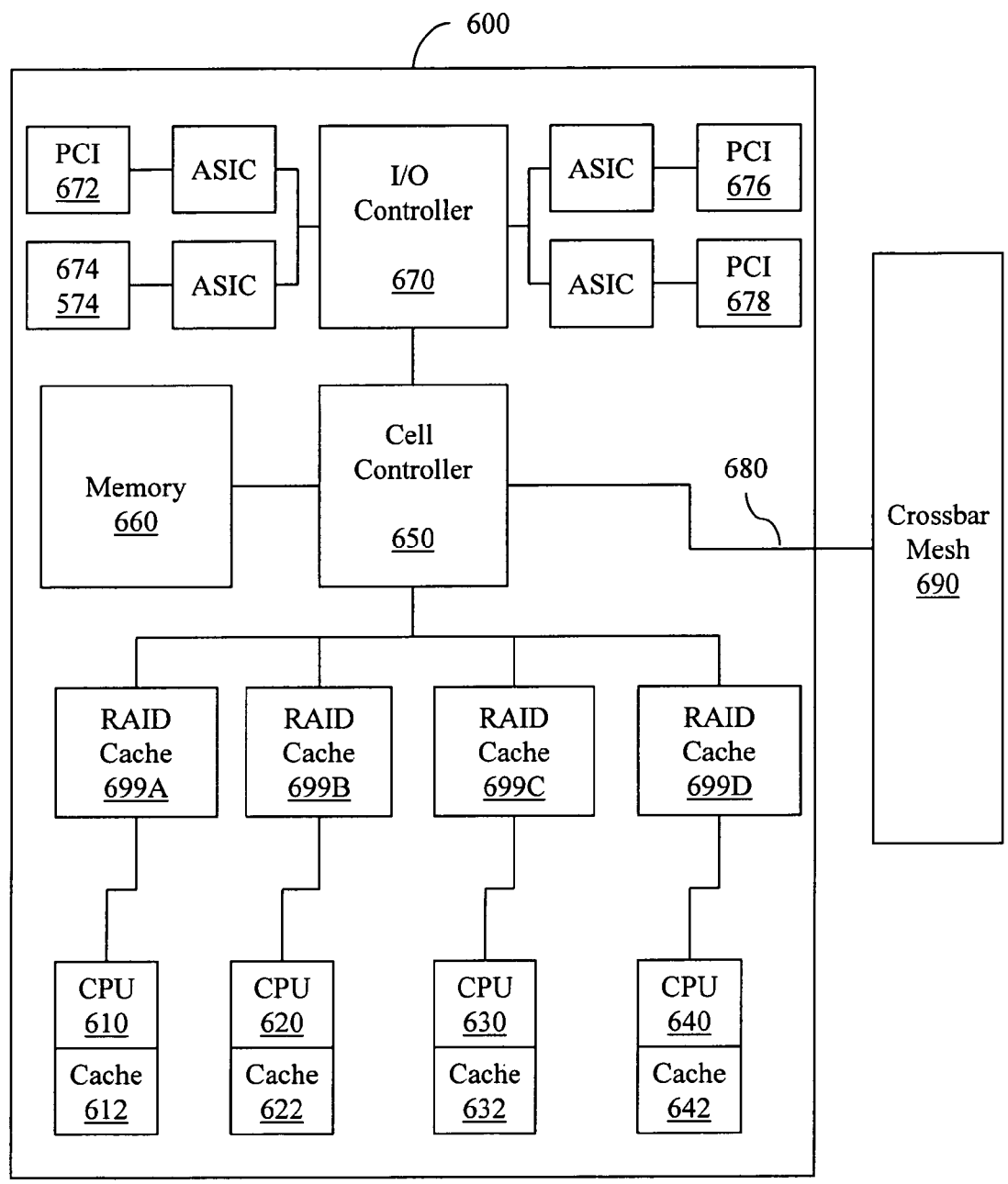
FIG. 6 illustrates an example cell configured with a RAID-enabling cache.

FIG. 6 illustrates an example cell 600 configured with four cpus (610, 620, 630, 640), each having a local cache(s) (612, 622, 632, 642). The example cell 600 also includes four RAID caches (699A, 699B, 699C, 699D) that are configured to facilitate implementing RAID memory for a cellular architecture including cell 600. RAID-enabling caches 699A, 699B, 699C, and 699D may, for example, map an address space that is visible to cpus 610 through 640 to implement RAID memory for that address space. Since cell 600 may be one of several cells in a cellular system, it is to be appreciated that a cache on cell 600 (e.g., RAID-enabling cache 699, cache 612) may include data from more than one cell. Thus, in different examples, when data from RAID-enabling cache 699A is cast out, the cast out data may be written to more than one cell. In one example, if RAID-enabling cache 699A is implementing a certain RAID level (e.g., RAID 5), then RAID cache 699A may be configured to write different cache lines to different cells. For example, if RAID cache 699A stores a super cache line equal to four cache lines, then each of the four cache lines may be written to a different cell. Additionally, parity information associated with data in the cache lines may be written to a fifth cell. While a super cache line size of four cache lines, four memory cells, and a fifth parity cell are described, it is to be appreciated that other super cache line sizes, other numbers of data cells, and other numbers of RAID-enabling (e.g., parity) cells may be employed. Furthermore, while RAID cache 699A is discussed, it is to be appreciated that the other RAID caches 699B-D may be configured to perform similar actions.

Figure 7:
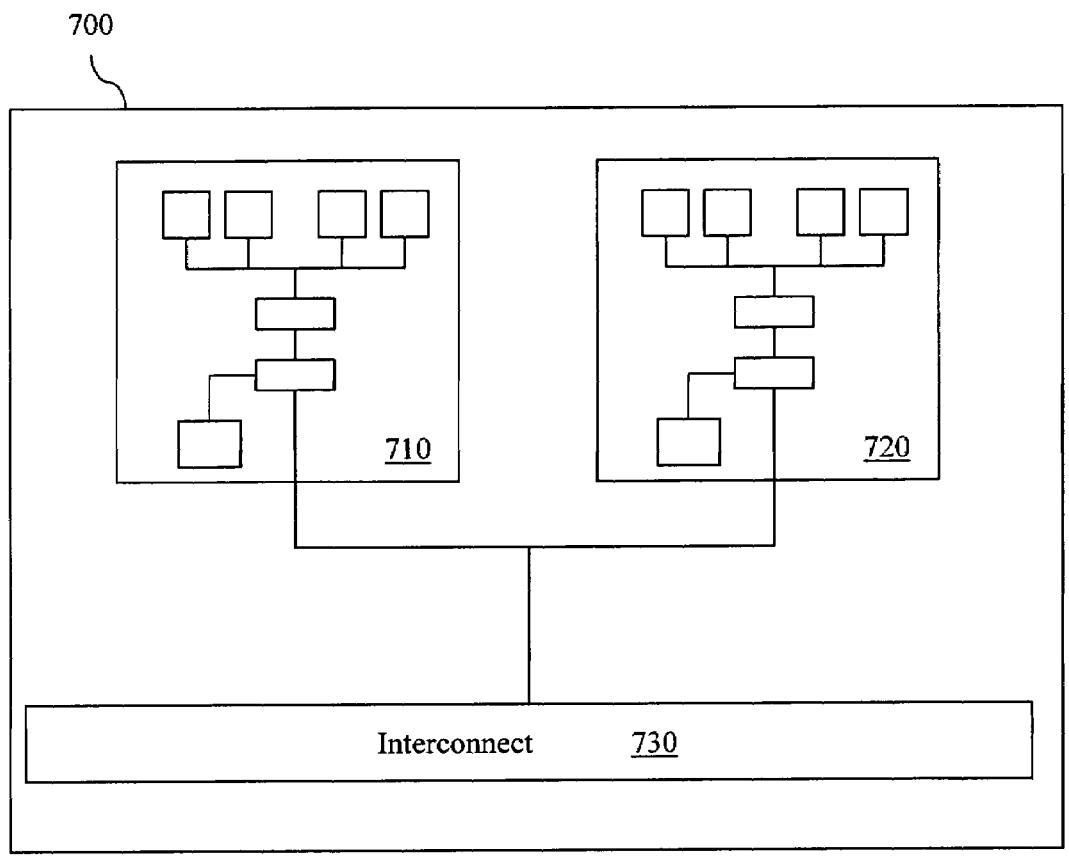
FIG. 7 illustrates an example cellular architecture implementing a mirroring RAID level.

FIG. 7 illustrates an example cellular architecture 700 configured with cells 710 and 720 connected by interconnect 730. While two cells are illustrated, it is to be appreciated that cellular architecture 700 may include a greater number of cells. Cells 710 and 720 may include RAID-enabling caches configured to implement RAID memory through mirroring. Thus, in architecture 700, the total address space visible to cpus on cells 710 and 720 may include memory locations available on both cells 710 and 720. In some examples, memory may be interleaved between cells 710 and 720. In other examples, the memory may be partitioned rather than interleaved.

In the mirroring example, RAID-enabling caches in cells 710 and 720 may be configured to split the global address space in two. Then, each line of memory in the global address space may be duplicated on a paired cell. For example, each line of memory in cell 710 may be replicated in cell 720. The replication may be performed by a RAID-enabling cache and/or a RAID logic working together with a RAID-enabling cache. For example, when a RAID-enabling cache casts out a line of memory, it may write it to both cell 710 and 720. Thus, if cell 720 goes down, system 700 may continue operating because the information stored in the memory on cell 720 is replicated on cell 710. In some examples, the hardware in system 700 can be configured so that this continued operation does not require the cooperation, supervision or even awareness of an operating system. When a replacement cell is provided for cell 720, the information stored on cell 710 can be used to recreate the memory in the replacement cell. Once again, operating system support may not be required.

System 700 may have a cache coherency system. Thus, RAID-enabling caches in system 700 may participate in this cache coherency system. The cache coherency system may be, for example, a directory based system, a MESI system (Modified, Exclusive, Shared, Invalid), and so on.

In some examples, a cellular architecture like architecture 700 in which mirroring is implemented by RAID-enabling caches may include more than two cells. In that case, cells in architecture 700 may be paired and the RAID-enabling caches in the paired cells may split the address space implemented by the paired cells. Then, when a line of memory is cast out from a RAID-enabling cache, it will be written to at least two locations.

Figure 8:
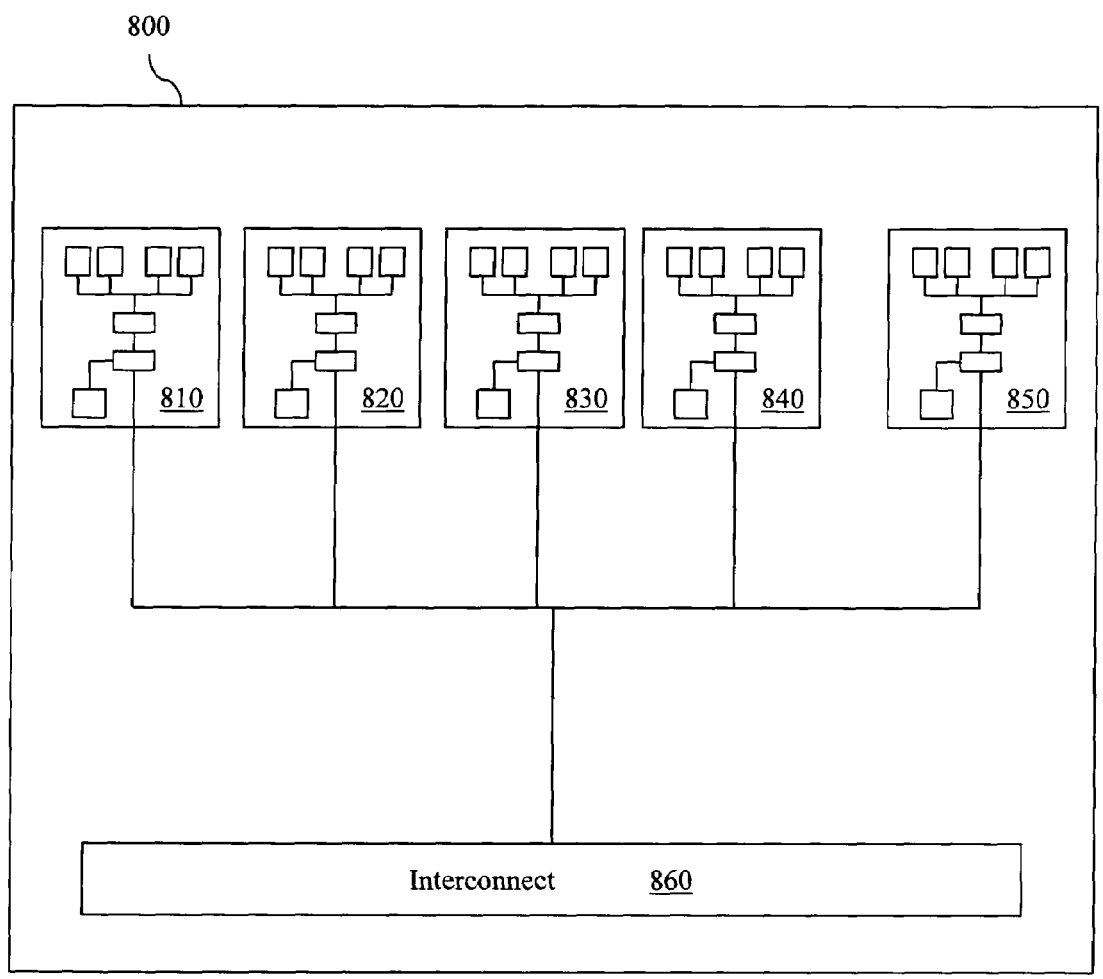
FIG. 8 illustrates an example cellular architecture implementing an example RAID level.

FIG. 8 illustrates an example cellular architecture 800 configured with cells 810 through 850 connected by interconnect 860. In one example, architecture 800 may be configured to implement a RAID scheme that includes block level striping with dedicated parity. Thus, cells 810 through 840 may store interleaved memory while cell 850 may be an additional, RAID-enabling cell that stores, for example, parity information associated with the interleaved memory. Thus, if cell 810 went down, information stored on cells 820 through 840, along with information stored in "parity" cell 850 could be used to recreate the information stored on cell 810. While five cells are illustrated implementing a RAID example, it is to be appreciated that different numbers of additional cells may be employed to facilitate implementing different RAID levels in a cellular architecture. Note that in some examples, cell 850 may be physically substantially identical to cells 810 through 840. Thus the RAID memory may be implemented with no additional specialized hardware.

In the example cellular architecture 800 illustrated in FIG. 8, assume that RAID-enabling caches on the cells are configured to store a super cache line equal to four cache lines from caches in processors on cells 810 through 840. If there is a cache miss in a cache in a processor on cells 810 through 840, then that processor may request a single line of memory from the RAID-enabling cache. Thus, from the cpu point of view, the RAID-enabling cache may implement a single line protocol. If there is a cache miss in the RAID-enabling cache, then the RAID-enabling cache may request four cache lines, one each from cells 810 through 840. Thus, from the interconnect point of view, the RAID-enabling cache may implement a multi-line protocol. The four lines may represent, for example, consecutive data lines in the cpu address space. However, with memory being interleaved, the four lines may come from four different cells. Thus, the RAID-enabling cache may implement a cache coherency protocol that facilitates maintaining cache integrity across the multiple cells. In one example, since data lines and parity lines backing up a super cache line in the RAID-enabling cache are guaranteed not to be allocated on the same cell, data for a missing cell can be reconstructed from other cells.

In the example illustrated in FIG. 8, a RAID-enabling cache may be configured to cast out four lines of data, with each modified line being written to a memory in a different cell. Similarly, a RAID-enabling cache may be configured to perform cache reads in a manner that acquired portions of a data line from different locations based on a RAID level and memory mapping in effect at that time. Additionally, if there was a modification, then a parity line may also be written to the parity cell. While cell 850 has been described as the parity cell, it is to be appreciated that the parity cell may be a logical designation, and that different cells may perform the role of the parity cell at different times. In this way, the effect of RAID memory may be achieved without using specialized hardware, specialized processors, or specialized busses. In one example, an existing cell may be retrofitted with a RAID-enabling cache. In this example, the processor (s) on the cell and software running on that processor(s) may remain unaware that the RAID-enabling cache has been added. In another example, a RAID-enabling cache may be user controllable and thus may be selectively controlled to either implement or not implement a RAID mechanism. Similarly, the RAID-enabling cache may be configured to implement different levels of RAID memory at different times under user and/or programmatic control. Once again, the processor(s) on a cell, the cell controller, software running on the cell, and so on may be unaware of the varying RAID memory actions and/or configurations.

In one example, the RAID-enabling caches may be inclusive of the contents of the caches logically above them (e.g., in the cpus). The RAID-enabling caches may store super-lines and may store cache coherency information for the super-lines. This cache coherency information may be superimposed atop normal RAID mechanisms. Thus, in one example, a cache coherency protocol like a MESI protocol may be used across a cellular architecture. For example, in one scheme, no two caches in a cellular architecture will be allowed to have modified access to different lines in a super-line. Therefore, if a first cpu operably connected to a first cache references for modification a line that is in a second cache, then the entire super-line may be recalled from the second cache and cpus operably connected to the second cache. Ownership of the line will then be transferred to the first cache as well as the contents of any modified lines. It is to be appreciated that other coherency schemes may be employed.

Figure 9:
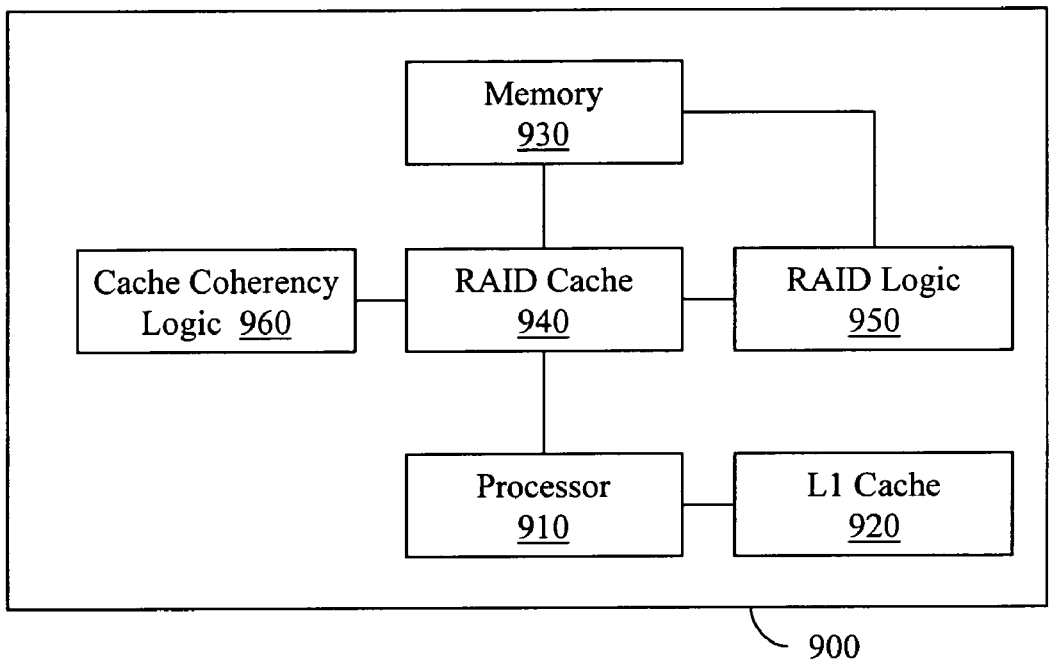
FIG. 9 illustrates an example cell employed in providing a RAID memory functionality for a cellular system.

FIG. 9 illustrates an example cell 900 that is configured to be used in a cellular computing system. Cell 900 includes a processor 910 to which an address space implemented for the cellular computing system is visible. The address space may be implemented in memory chips distributed between various cells in the cellular computing system. Thus, cell 900 may include a memory 930 that is operably connected to processor 910. At least a portion of the address space will be mapped to memory 930.

Cell 900 may also include a first level cache 920 that is operably connected to processor 910. The first level (L1) cache 920 may store, for example, data retrieved from the physical memory distributed throughout the cellular system. This may include data retrieved from memory 930.

Cell 900 may also include a RAID cache 940 that is operably connected to processor 910. RAID cache 940 may facilitate providing a RAID memory functionality for the cellular system by participating in an address mapping that supports RAID memory and by having its reads and/or writes controlled to implement the RAID memory. Thus, cell 900 may also include a RAID logic 950 that is operably connected to RAID cache 940. RAID logic 950 may be configured to map the address space available to the cellular system in a mapping that implements a level of RAID memory for the cellular computing system. In one example, the mapping will be transparent to processor 910 and first level cache 920. While RAID logic 950 is illustrated separate from RAID cache 940, it is to be appreciated that in some example RAID logic 950 may be, for example, a cache controller and be part of RAID cache 940.

Cell 900 may also include a cache coherency logic 960 that is operably connected to RAID cache 940 and that is configured to maintain cache coherency for RAID cache 940. Cell 900 may therefore have cache coherency both above processor 910 (e.g., in L1 cache 920) and below processor 910 (e.g., in RAID cache 940). Once again, while cache coherency logic 960 is illustrated separate from RAID cache 940, it is to be appreciated that in some examples cache coherency logic 960 may be part of RAID cache 940. In one example, cell 900 may also include an I/O controller (not illustrated) to which RAID cache 940 and/or RAID logic 950 may be operably connected. Additionally, and/or alternatively, cell 900 may include a second RAID cache (not illustrated) configured to interact with the I/O controller.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 10:
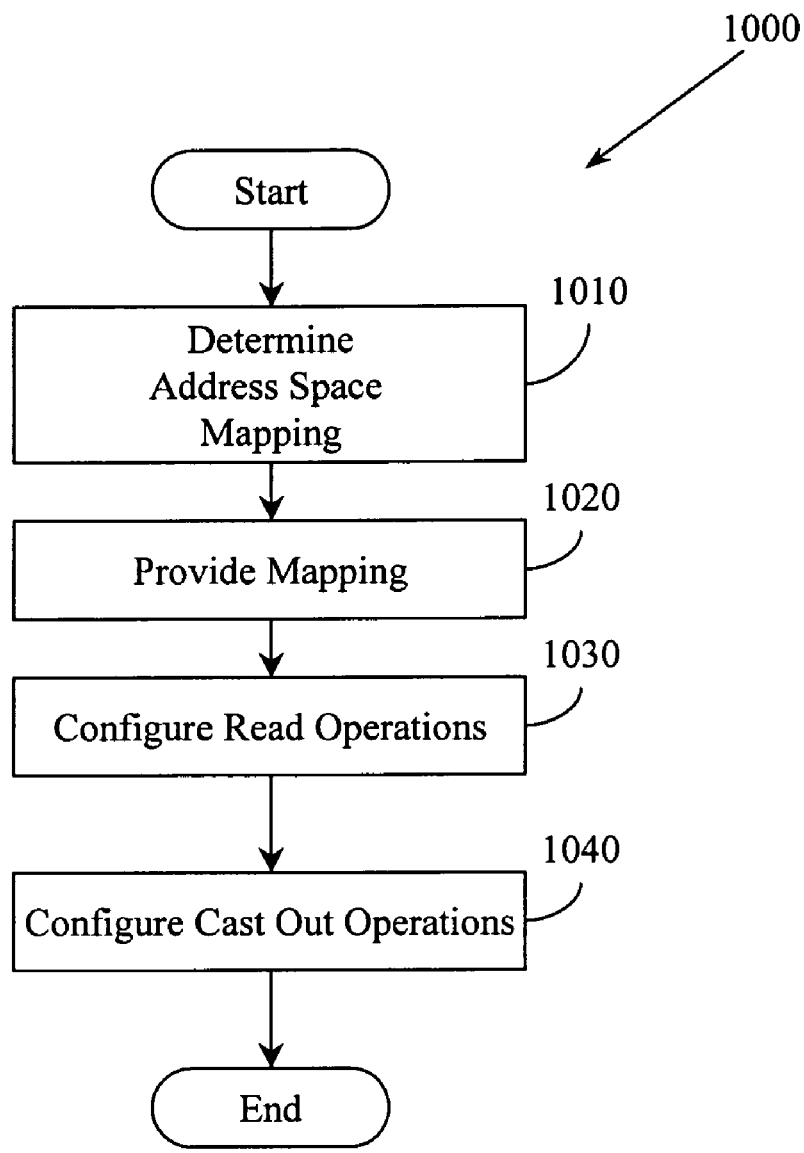
FIG. 10 illustrates an example method associated with providing a RAID memory functionality for a cellular system.
Figure 11:
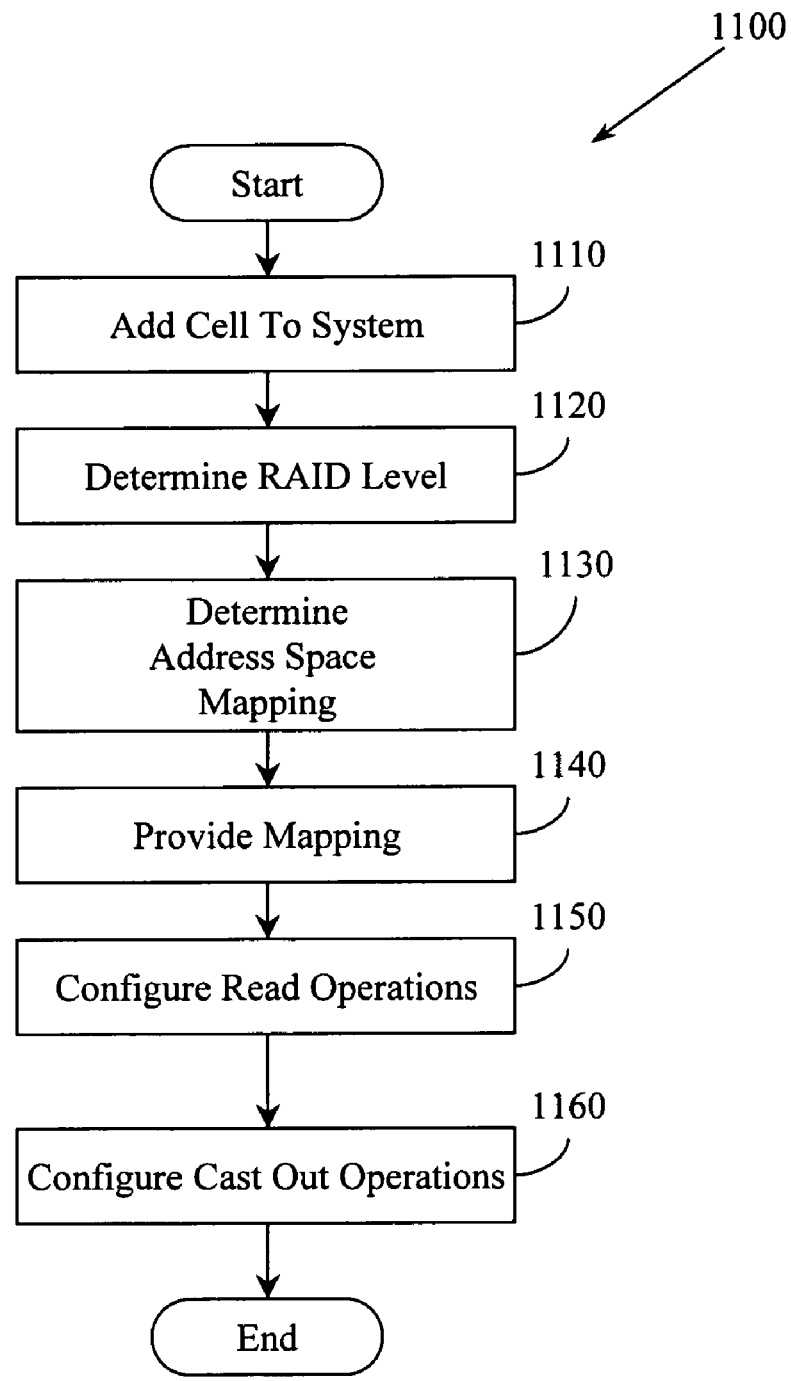
FIG. 11 illustrates another example method associated with providing a RAID memory functionality for a cellular system.

FIGS. 10 and 11 illustrate example methods associated with providing a RAID memory functionality to a cellular computing system. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, portions of the described methodologies may be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The diagrams of FIGS. 10 and 11 are not intended to limit the implementation of the described examples. Rather, the diagrams illustrate functional information one skilled in the art could use to design/fabricate circuits, generate software, or use a combination of hardware and software to perform the illustrated processing.

FIG. 10 illustrates a method 1000 that is associated with providing a RAID memory functionality to a cellular computing system. Method 1000 may include, at 1010 determining an address space mapping for the cellular computing system. The address space mapping may facilitate cache-based memory RAIDing by, for example, describing memory partitioning for mirroring, describing where parity information is to be recorded, describing how memory is to be striped across cells, and so on. Method 1000 may also include, at 1020, providing the mapping to a cache on a cell in the cellular computing system. In one example, the cache may be inclusive of any other caches on the cell. For example, an external L4 cache may be inclusive of L1-L3 caches associated with a processor.

Method 1000 may also include, at 1030, configuring the cache to selectively control cache read operations. Selectively controlling cache read operations can facilitate implementing a portion(s) of the RAID memory functionality. Since the memory has been mapped to facilitate implementing the RAID memory, the cache read operations may be configured to operate in accordance with the address space mapping. For example, for a first RAID functionality, a cache read may touch memory in a first set of cells while for a second RAID functionality, a cache read may touch memory in a second set of cells. Additionally, a cache read may need to consider acquiring parity information if a portion of a mapped memory space is inoperable because, for example, a cell is down.

Method 1000 may also include, at 1040, configuring the cache to selectively control cache cast out operations to implement, at least in part, the RAID memory functionality in accordance with the mapping. Selectively controlling cache cast out operations can facilitate implementing a portion(s) of the RAID memory functionality. Since the memory has been mapped to facilitate implementing the RAID memory, the cast out operations may be configured to operate in accordance with the address space mapping. For example, for a first RAID functionality, a cast out operation may write memory to a first set of cells while for a second RAID functionality, a cast out operation may write memory to a second set of cells. Additionally, a cast out operation may need to consider writing parity information. In some examples, the cache read and/or cast out operations may include reading and/or writing data in accordance with a striping technique, a mirroring technique, a parity technique, and so on, where the techniques are associated with the RAID memory functionality.

Method 1000 may also include, not illustrated, configuring the cache to participate in a cache coherency protocol associated with the cellular computing system. The cache coherency protocol may be, for example, a MESI protocol, a directory based protocol, and so on.

While FIG. 10 illustrates various actions occurring in serial, it is to be appreciated that various actions illustrated in FIG. 10 could occur substantially in parallel. By way of illustration, a first process could determine an address space mapping. Similarly, a second process could configure read operations on a cache in accordance with a RAID level and the address space mapping, while a third process could configure cast out operations for a cache in accordance with the RAID level and the address space mapping. While three processes are described, it is to be appreciated that a greater and/or lesser number of processes could be employed and that lightweight processes, regular processes, threads, and other approaches could be employed.

FIG. 11 illustrates a method 1100 associated with providing a RAID memory functionality to a cellular computing system. Method 1100 includes actions 1130 through 1160 that are similar to actions 1010 through 1040 in FIG. 10. Additionally, method 1100 may include, at 1110, adding an additional cell(s) to the cellular computing system. Note that this cell may not include any specialized hardware, and may be physically substantially similar to other cells in the cellular system. The additional cell may be configured to store data items associated with implementing the RAID memory functionality like parity information, ECC information, mirrored data, striped data, and so on.

Method 1100 may also include, at 1120, determining a level of RAID memory functionality to be provided to the cellular computing system. For example, a user may provide a RAID memory level for the system to implement, a usage pattern may be examined to determine what RAID memory level to establish, and so on. Thus, configuring the cache to selectively control cache read and/or cast out operations may include configuring the cache to implement the determined level of RAID memory functionality. As described above, the different RAID memory functionality levels may include performing different combinations of striping techniques, mirroring techniques, parity techniques, and so on at bit, byte, and/or block levels.

In one example, methodologies are implemented as processor executable instructions and/or operations stored on a computer-readable medium. Thus, in one example, a computer-readable medium may store processor executable instructions operable to perform a method that includes determining an address space mapping for a cellular computing system to facilitate cache-based memory RAIDing. The method may also include providing the mapping to a cache on a cell in the cellular computing system where the cache is inclusive of all other caches on the cell. The method may also include configuring the cache to selectively control cache read and/or cast out operations to implement, at least in part, the RAID memory functionality in accordance with the address space mapping. While the above method is described being stored on a computer-readable medium, it is to be appreciated that other example methods described herein can also be stored on a computer-readable medium.

FIG. 12 illustrates an example cell 1200 that includes an additional RAID-enabling cache 1210. Additional cache 1210 may be configured to facilitate implementing RAID memory for a cellular architecture of which cell 1200 is a component. Additional cache 1200 and/or a RAID logic (not illustrated) associated with RAID cache 1200 may be configured to map an address space visible to an I/O controller 1220 to implement RAID memory of various levels (e.g., RAID0, RAID5, . . . ) for the cellular architecture. In some examples, RAID cache 1210 and other RAID caches described herein may include both memory and a cache controller and/or cache logic.

Cell 1200 may include, for example, I/O controller 1220. While a single I/O controller 1220 is illustrated, it is to be appreciated that a cell may have more than one I/O controller and I/O components. Typically, I/O controller 1220 would interact with cell controller 1230 without RAID cache 1210 being interposed therebetween.

It is to be appreciated that in a cellular architecture, additional cache 1210 may interact with memory 1240 on cell 1200 and other memories that are located on other cells in the cellular architecture. These interactions may be communicated via bus 1270 and an interconnect like crossbar mesh 1280 to other cells. Thus, additional cache 1210 may be configured to map the address space available in memory 1240 and the other memories in the cellular architecture to implement RAID memory for cell 1200 and the cellular architecture and, when involved in cache reads and/or cache cast outs, to read and/or write multiple cache lines of data associated with multiple cells similarly configured to implement RAID memory for the cellular architecture.

In one example, the computer components illustrated in FIG. 9 and/or other computer components described herein may provide means for determining a RAID memory level for a cellular computing system. The computer components in FIG. 9 may also provide means for mapping an address space associated with the cellular computing system to facilitate providing the determined RAID memory level, and means for controlling a cache controller on a cell in the cellular computing system so that cache reads and/or cast out operations are performed in accordance with the RAID memory level. Furthermore, the computer components illustrated in FIG. 9 may provide means for controlling the cache controller to participate in a system-wide cache coherency protocol.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A cell configured to be used in a cellular computing system, comprising:
   a processor to which an address space implemented for the cellular computing system is visible;
   a first level cache operably connected to the processor;
   a memory operably connected to the processor, at least a portion of the address space being mapped to the memory;
   a RAID cache operably connected to the processor;
   a RAID logic operably connected to the RAID cache, the RAID logic being configured to map the address space in a mapping that supports a level of RAID memory for the cellular computing system, the mapping being transparent to the processor and the first level cache; and
   a cache coherency logic configured to maintain cache coherency for the RAID cache.

2. The cell of claim 1, comprising:
   one or more additional caches operably connected to the processor, the cache coherency logic being configured to maintain cache coherency for the first level cache, the RAID cache, and the additional caches.

3. The cell of claim 1, including one or more additional processors to which the address space is visible, each of the additional processors being operably connected to at least one first level cache.

4. The cell of claim 1, the cache coherency logic being configured to maintain cache coherency according to one or more of, a MESI (Modified, Exclusive, Shared, Invalid) cache coherency protocol, and a directory based cache coherency protocol.

5. The cell of claim 1, the level of RAID memory being selectable by one or more of, a user, a logic, and a process.

6. The cell of claim 1, the RAID logic being a cache controller and being part of the RAID cache.

7. The cell of claim 6, the cache coherency logic being part of the cache controller.

8. The cell of claim 1, the RAID logic being configured to implement RAID memory levels from RAID 0 through RAID 7 using one or more of, a mirroring technique, a striping technique, a duplexing technique, and a parity technique at one or more of, a bit level, a byte level, and a block level.

9. The cell of claim 1, the first level cache being part of the same integrated circuit as the processor.

10. The cell of claim 9, the RAID cache not being part of the same integrated circuit as the processor.

11. The cell of claim 1, the cellular computing system being a cache coherent non-uniform memory access (ccNUMA) system.

12. The cell of claim 1, the RAID cache being configured to selectively determine whether a parity data is to be written upon a cast out from the RAID cache.

13. The cell of claim 12, the RAID cache being configured to selectively cast out data to more than one cell.

14. The cell of claim 1, the cell being operably connected to one or more second cells to form the cellular computing system, the address space including the memory on the cell and the one or more second cells, the address space being visible to each of the cells in the cellular computing system.

15. The cell of claim 14, further comprising one or more additional similarly configured cells configured to store a data item employed in implementing the level of RAID memory.

16. The cell of claim 1, comprising:
   one or more additional caches operably connected to the processor, the cache coherency logic being configured to maintain cache coherency for the first level cache, the RAID cache, and the additional caches; and
   one or more additional processors to which the address space is visible, each of the additional processors being operably connected to at least one first level cache;
   the cache coherency logic being configured to maintain cache coherency according to one of, a MESI (Modified, Exclusive, Shared, Invalid) cache coherency protocol, and a directory based cache coherency protocol;
   the level of RAID memory being selectable by one or more of, a user, a logic, and a process;
   the RAID logic being a cache controller and being part of the RAID cache;
   the cache coherency logic being part of a cache controller;
   the RAID logic being configured to implement RAID memory levels from RAID 0 through RAID 7 using one or more of, a mirroring technique, a striping technique, a duplexing technique, and a parity technique at one or more of, a bit level, a byte level, and a block level; and
   the RAID cache being configured to selectively determine whether a parity data is to be written upon a cast out from the RAID cache and to selectively cast out data to more than one cell.

17. A system, comprising:
   means for determining a RAID memory level for a cellular computing system;
   means for mapping an address space associated with the cellular computing system to facilitate providing the determined RAID memory level;
   means for controlling a cache controller on a cell in the cellular computing system so that cache reads are performed in accordance with the RAID memory level;
   means for controlling the cache controller so that cache casts out are performed in accordance with the RAID memory level; and
   means for controlling the cache controller to participate in a system-wide cache coherency protocol.

18. A multi-cell computing system, comprising:
   two or more cells, each cell comprising:
      a processor to which an address space implemented for the multi-cell computing system is visible;
      a first level cache operably connected to the processor;
      a memory operably connected to the processor, at least a portion of the address space being mapped to the memory;
      a RAID cache operably connected to the processor;
      a RAID logic operably connected to the RAID cache, the RAID logic being configured to map the address space in a mapping that supports a level of RAID memory for the multi-cell computing system; and
      a cache coherency logic configured to maintain cache coherency for the RAID cache.

19. A cell configured to be used in a cellular computing system, comprising:
   an input/output controller to which an address space implemented for the cellular computing system is visible;

a memory operably connected to the input/output controller, at least a portion of the address space being mapped to the memory;

a RAID cache operably connected to the input/output controller;

a RAID logic operably connected to the RAID cache, the RAID logic being configured to map the address space in a mapping that supports a level of RAID memory for the cellular computing system, the mapping being transparent to the input/output controller; and a cache coherency logic configured to maintain cache coherency for the RAID cache.

20. A method for providing a RAID memory functionality to a cellular computing system, comprising:

determining an address space mapping for the cellular computing system to facilitate cache-based memory RAIDing;

providing the mapping to a cache on a cell in the cellular computing system, the cache being inclusive of other caches on the cell;

configuring the cache to selectively control cache read operations to implement, at least in part, the RAID memory functionality in accordance with the address space mapping; and configuring the cache to selectively control cache cast out operations to implement, at least in part, the RAID memory functionality in accordance with the mapping.

21. The method of claim 20, including configuring the cache to participate in a cache coherency protocol associated with the cellular computing system.

22. The method of claim 21, where the cache read operations include reading data in accordance with one or more of, a striping technique, a mirroring technique, and a parity technique.

23. The method of claim 22, where the cache cast out operations include writing data in accordance with one or more of, the striping technique, the mirroring technique, and the parity technique.

24. The method of claim 23, including adding an additional cell to the cellular computing system, the additional cell being configured to store a data item associated with implementing the RAID memory functionality.

25. The method of claim 23, including:

determining a level of RAID memory functionality to be provided to the cellular computing system;

configuring the cache to selectively control cache read operations to implement the determined level of RAID memory functionality; and configuring the cache to selectively control cache cast out operations to implement the determined level of RAID memory functionality.

26. The method of claim 23, the method being stored as a set of processor executable instructions on a computer-readable medium.

27. The method of claim 20, comprising:

configuring the cache to participate in a cache coherency protocol associated with the cellular computing system; and adding an additional cell to the cellular computing system, the additional cell being configured to store a data item associated with implementing the RAID memory functionality, where the RAID memory functionality includes performing one or more of, a striping technique, a mirroring technique, and a parity technique.

* * * * *